United States Patent [19]

Guigonis et al.

[11] 4,308,067
[45] Dec. 29, 1981

[54] UNSHAPED REFRACTORY COMPOSITIONS USEFUL AS JOINTING AND MOULDING COMPOSITIONS

[75] Inventors: Jacques Guigonis, Entraigues; Pierre Jeanvoine, Morieres les Avignon, both of France

[73] Assignee: Societe Europeenne des Produits Refractaires, Neuilly-sur-Seine, France

[21] Appl. No.: 156,273

[22] Filed: Jun. 4, 1980

[30] Foreign Application Priority Data

Jun. 11, 1979 [FR] France .................. 79 14860

[51] Int. Cl.³ .................. C04B 35/48; C04B 35/14
[52] U.S. Cl. .................. 501/105; 501/115; 501/132
[58] Field of Search .................. 106/57, 64

[56] References Cited

U.S. PATENT DOCUMENTS

| | | | |
|---|---|---|---|
| 3,304,187 | 2/1967 | Limes et al. | 106/57 |
| 3,519,447 | 7/1970 | Adams et al. | 106/57 |
| 3,782,980 | 1/1974 | Smith | 106/57 |
| 3,992,213 | 11/1976 | Desouches et al. | 106/57 |
| 4,111,711 | 9/1978 | Kiehl et al. | 106/97 |
| 4,119,472 | 10/1978 | Brashear, Jr. et al. | 106/57 |

FOREIGN PATENT DOCUMENTS 2000881 9/1969 France .

*Primary Examiner*—O. R. Vertiz
*Assistant Examiner*—Mark Bell
*Attorney, Agent, or Firm*—Watson, Cole, Grindle & Watson

[57] ABSTRACT

The invention refers to an unshaped refractory composition which can be used in the construction of glass furnace hearths and which comprises by weight:

(a) 55 to 99% of particles of a fused cast refractory material, the fused cast refractory material including a vitreous phase and containing, as main constituents, $ZrO_2$, $Al_2O_3$, $SiO_2$, and optionally $Cr_2O_3$;
(b) 0 to 5% of a hydraulic cement;
(c) 1 to 15% of a filler consisting of very fine, substantially spherical particles of a metal oxide;
(d) 0 to 25% of fine particles of a size less than 40 microns chosen from particles of $ZrO_2$, $Al_2O_3$, $Cr_2O_3$, fused cast refractory products comprising by weight 75–85% $ZrO_2$, 2–8% $SiO_2$, 9–17% $Al_2O_3$, 0.5–0.7% of other oxides, and mixtures thereof; and
(e) 0.01 to 1% of a surface-active agent, the amount being with respect to the total weight of the constituents (a), (b), (c) and (d).

7 Claims, No Drawings

UNSHAPED REFRACTORY COMPOSITIONS USEFUL AS JOINTING AND MOULDING COMPOSITIONS

BACKGROUND OF THE INVENTION

The present invention relates to unshaped refractory compositions based on fused cast oxides grains including a vitreous phase, these compositions being useful as jointing compositions and as moulding compositions.

The glass industry generally employs for the construction of its furnaces either fused cast or bonded refractory products of great purity, which products are highly resistant to corrosion by the glass. However, in order to render glasstight certain portions of the glass furnaces against infiltration of the molten glass which causes certain corrosion phenomena, it is necessary to employ unshaped refractory materials for jointing the blocks of refractory products. This problem exists more particularly for the hearths of glass furnaces where the glass infiltrates into the joints which exist between the slabs of either fused cast or bonded refractory products, corrodes the refractory materials employed to form the layer underlying the slabs (the bed), and then attacks the slabs themselves from below by a corrosion mechanism called "upward drilling".

The general idea of rendering a hearth of the glass furnace glasstight is described in French Pat. No. 818.571 which proposes for this purpose the use of a granular jointing matter consisting of free refractory granules free of binder, which sets, by sintering in situ, only when the furnace reaches its working temperature.

The solution proposed in this French patent has not, however, had a great success because of the difficulty in putting the jointing matter into place in the joints which may be of very small size.

The object of the present invention is to provide an unshaped refractory composition usable as jointing matter, in particular for the joints between the slabs in the hearth of a glass furnace, as well as for the manufacture by moulding of raw or fired refractory articles.

SUMMARY OF THE INVENTION

According to the present invention, the jointing may be successfully achieved by use of an unshaped refractory composition which comprises by weight:

(a) 55 to 99% of particles of a fused cast refractory material which contains a vitreous phase and the composition of which contains, as main constituents, $ZrO_2$, $Al_2O_3$ and $SiO_2$, or $ZrO_2$, $Al_2O_3$, $SiO_2$ and $Cr_2O_3$;

(b) 0 to 5% of a hydraulic cement;

(c) 1 to 15% of a filler consisting of very fine, substantially spherical particles of a metal oxide, the surface area of these particles being higher than 5 $m^2/g$;

(d) 0 to 25% of fine particles of a size less than 40 microns selected from the group consisting essentially of particles of zirconia, alumina, chromic oxide $Cr_2O_3$, fused cast refractory products the chemical composition of which comprises by weight 75–85% $ZrO_2$, 2–8% $SiO_2$, 9–17% $Al_2O_3$, 0.5–0.7% of other oxides, and mixtures thereof;

the proportion of each of the constituents (a), (b), (c) and (d) being given with respect to the total of the ingredients (a), (b), (c) and (d); and (e) 0.01 to 1% of a surface-active agent, the amount being with respect to the total weight of the constituents (a), (b), (c) and (d).

The constituent (a) forms 55 to 99% by weight of the composition of the invention. Preferably it forms at least 75% of the composition. The particles of constituent (a) advantageously have sizes not greater than 5 mm.

As examples of constituent (a) which may be employed, the following may be mentioned:

the family of "oxidized" products which exhibit the following composition by weight on an oxide basis:
$ZrO_2$ = 32.5 to 54%
$Al_2O_3$ = 36 to 51%
$SiO_2$ = 2 to 16%
$Na_2O$ = 0.28 to 1.5%
other oxides < 1.5% and prepared by the method described in French Pat. No. 1,208,577 and its Addition No. 75,893.

Such products are manufactured and sold by Societe Europeenne Des Products Refractaires of Neuilly-Sur-Seine, France under the trade designations ER 1681 (Product 1 in Table 1) and ER 1711 (Product 2 in Table 1).

the family of products having a high zirconia content, described in French Pat. No. 1,191,665 and having the following composition by weight on an oxide basis:
$ZrO_2$ = 75 to 85%
$SiO_2$ = 2 to 8%
$Al_2O_3$ = 9 to 17%
other oxides = 0.5 to 0.7%

A preferred product of this species is Product No. 4 in Table 1.

the family of products described in French Pat. No. 2,183,604, the composition of which by weight, on an oxide basis, is, for example, the following:
$Cr_2O_3$ = 1 to 75%
$ZrO_2$ = 15 to 40%
$Al_2O_3$ = 3 to 76%
$SiO_2$ = 7.5 to 20%
$Na_2O$ = 0.4 to 2.5%
the ratio $SiO_2/Na_2O$ being between about 8 and 18.

A product of this type is Product No. 3 in Table 1.

The foregoing list is not be considered restrictive as other refractory products based on $ZrO_2$, $Al_2O_3$ and $SiO_2$ or on $Al_2O_3$, $SiO_2$, $ZrO_2$ and $Cr_2O_3$ may be employed so long as they contain a vitreous phase. The inventors have in fact found that the presence of such a vitreous phase improves the mechanical properties of the materials prepared from the compositions of the invention and facilitates the bonding of the joints with the blocks of refractory products during the course of the gradual heating of the glass furnace.

Particular examples of products suitable as Constituent (a) are given in Table 1 below.

TABLE 1

| Chemical and crystallographic composition | | Product | | | |
|---|---|---|---|---|---|
| | | No. 1 | No. 2 | No. 3 | No. 4 |
| $Al_2O_3$, | % by wt. | 50.6 | 45.9 | 28.3 | 15 |
| $ZrO_2$, | % by wt. | 32.5 | 40.8 | 28.0 | 80 |
| $SiO_2$, | % by wt. | 15.7 | 12.3 | 14.5 | 5 |
| $Cr_2O_3$, | % by wt. | — | — | 28.0 | — |
| $Na_2O$, | % by wt. | 1.1 | 0.8 | 1.1 | — |
| $Fe_2O_3$, | % by wt. | 0.1 | 0.1 | 0.1 | 0.1 |
| $TiO_2$, | % by wt. | 0.1 | 0.1 | 0.1 | 0.1 |
| Vitreous phase | % by wt. | 21 | 16 | 20 | 4–5 |
| Crystalline phase Including | % by wt. | 79 Corundum | 84 Corundum | 80 Solid Solution | 95–96 Corundum |

TABLE 1-continued

| Chemical and crystallographic composition | Product | | | |
|---|---|---|---|---|
| | No.1 | No. 2 | No.3 | No.4 |
| | Zirconia | Zirconia | Zirconia | Zirconia Mullite |

The constituent (a) is employed in the form of a mixture of particles of various sizes, the granulometric composition of which is adapted to the final contemplated use. Thus, it has been found convenient to prepare the following four granulometric classes of particles of the constituent (a) by grinding and screening:

| Screen opening in microns | cumulated residue, % by weight | |
|---|---|---|
| | Maximum | Minimum |
| (1) Granules (sizes from about 2 to 5 mm) | | |
| 5000 | 10 | 0 |
| 4000 | 35 | 10 |
| 3150 | 60 | 40 |
| 2000 | 95 | 75 |
| 1600 | 100 | 95 |
| (2) Small grain (sizes from about 0.5 to 2 mm) | | |
| 2000 | 10 | 0 |
| 1600 | 30 | 10 |
| 800 | 90 | 70 |
| 400 | 100 | 95 |
| (3) Flour (sizes from about 40μ to 0.5 mm) | | |
| 500 | 10 | 0 |
| 400 | 25 | 5 |
| 250 | 45 | 25 |
| 100 | 75 | 55 |
| 40 | 90 | 70 |
| Diameter of the particles in μ | cumulated percentage by weight | |
| | Maximum | Minimum |
| (4) Fines (sizes less than about 40μ) | | |
| 20-40 | 15 | 0 |
| 10-20 | 35 | 0 |
| 5-10 | 60 | 20 |
| 1-5 | 80 | 35 |
| 0.05-1 | 100 | 70 |
| <0.5 | 100 | 80 |

Depending upon the thickness of the joints to be filled, two or more of these granulometric classes will be mixed in suitable proportions, the smaller the thickness of the joint the finer the utilized granulometric composition. Thus it has been found that in order to fill joints of a thickness less than 10 mm, a constituent (a) might be employed with good results, which is formed of 35 to 100% fines (4), and of 0 to 65% of flour (3); for joints of a thickness of 10 to 25 mm, a constituent (a) may be employed which is formed of 30 to 60% small grain (2), of 15 to 30% of flour (3) and of 0 to 40% fines (4); and for joints of a thickness greater than 25 mm, a constituent may be employed which is formed of 15 to 45% of granules (1), 20 to 40% small grain (2), 15 to 30% flour (3) and 0 to 40% of fines (4). This latter granulometric composition is also very suitable for the manufacture of articles by moulding. Of course, one might employ granulometric classes which have limits substantially different from those indicated above.

The constituent (b) forms 0 to 5% by weight of the composition, preferably 1 to 4% by weight. The hydraulic cement (b) may, for example, be a conventional Portland cement or an aluminous cement like those of Ciment Fondu type or of superaluminous type. The use of a superaluminous cement is preferred, such as Secar ® 250 or Alcoa ® CA25 in order to minimize the amount of lime contributed by the cement. The lime (CaO) tends in fact to reduce the resistance of the material (a) to corrosion by the glass.

The constituent (c) forms 1 to 15% by weight of the composition, preferably 3 to 7%. The constituent (c) is formed of very fine, substantially spherical particles of a metal oxide chosen from silica, alumina, chromic oxide $Cr_2O_3$ and zirconia, the surface area of these particles being higher than 5 m²/g. At present it is quite particularly preferred to use particles of vitreous silica of a size of 100 Å to 5μ called also "fumed silica". This vitreous silica has a content of $SiO_2$ of at least 98%, and the balance may be formed of $Na_2O$, $Al_2O_3$ or $ZrO_2$, and appears in the form of microspheres. Particles of silica of this type are well known and available in the trade. For economic reasons it has been found advantageous to employ the particles of vitreous silica obtained by thermal reduction of zirconium silicate in zirconia and condensation.

The presence of the constituent (c) enables a decrease in the amount of water which is necessary for rendering the compositions of the invention pourable. It seems that the very fine particles of the constituent (c) act by coming and seating themselves in the pores of very small diameter (less than 1 micron) and enable the particles of the constituent (a) to slide or roll over one another, thus improving the pourability of the composition and also enabling a more compact placement of the particles forming the composition with the concomitant obtaining of a better bond between the latter in the final product.

The optional constituent (d), which forms 0 to 25%, preferably 6 to 25% by weight of the composition, may be added to the composition in order to improve the resistance to corrosion of the compositions of the invention at the level of the particles of a size less than 100 microns and in which the porosity is found to be concentrated. The constituent (d) is formed of particles or of mixtures of particles of a size less than 40 microns, preferably less than 15 microns, formed from $ZrO_2$, $Al_2O_3$, $Cr_2O_3$ or a fused cast refractory material, the chemical composition of which comprises by weight 75–85% $ZrO_2$, 2–8% $SiO_2$, 9–17% $Al_2O_3$ and 0.5–0.7% of other oxides. By particles of $ZrO_2$, $Al_2O_3$ or $Cr_2O_3$, are meant particles the chemical composition of which contains at least 98% by weight of $ZrO_2$, $Al_2O_3$, or $Cr_2O_3$.

The fine particles of the constituent (d) fill the pores of small diameter which exist between the coarser particles present in the composition, and because they consist of a material which exhibits high resistance to corrosion by molten glass, they strengthen the overall resistance of the fine particles present in the composition. The sum of the percentages of the constituents (a) to (d) is equal to 100%.

The constituent (e) is present in an amount of 0.01 to 1% with respect to the weight of the constituents (a) to (d) and consists of a surface-active agent, the role of which is to modify the rheological properties of the jointing composition prepared from the composition of the invention, making it change from a Binghamian behaviour to a Newtonian behaviour, thus facilitating the filling of the joints of small thickness by simple pouring of this jointing composition into the joints. The nature of the surface-active agent is not critical. One may employ, for example, sodium polycarboxylates, long-chain polyphosphates of alkaline metals, sodium polyacrylate, etc. Numerous useful surface-active agents are available in the trade. One may mention, for example, Giltex ® E (a long-chain sodium polyphosphate sold by Rhône-Poulenc company).

When it is desired to work up the compositions of the invention, they are mixed intimately with an amount of water of between 3 and 25%, preferably between 4 and 10% by weight with respect to the total weight of the constituents (a) to (d).

As has been noted, the compositions of the invention are useful as jointing compositions, that is to say, for filling joints between blocks or slabs of fused cast refractory material forming the lining of glass furnaces. The compositions comprising granules (2 to 5 mm) of constituent (a) are also useful for producing the bed supporting such blocks or slabs.

The compositions of the invention may also serve for manufacturing parts of simple shape, such as bricks, by mechanical pressing, or for fabricating pieces of more complicated shape by casting and vibrating. The characteristics of the parts may be improved by effecting degassing, by carrying out the casting under vacuum, etc., if desired.

The non-restrictive following examples are given for illustrating the invention.

EXAMPLE I

Three compositions A, B and C in accordance with the invention are prepared, which have the compositions indicated in Table 2. In order to test these compositions it is necessary to shape them and fire them. The shaping is effected in moulds in accordance with conventional techniques in order to obtain, for example, parts of parallelepipedal shape from which, in accordance with the standards, samples will be removed in order to measure certain physical properties thereof and the behaviour to corrosion by glass. The measures mentioned in the various examples are carried out firstly after drying to 110° C. for 24 hours, then after firing at 1500° C. for at least 5 hours in order to ensure a correct sintering of the particles.

The test for corrosion by glass in a dynamic test described by J. Recasens, A. Sevin and M. Gardiol at the 8th International Glass Congress in London in 1968. This test consists in measuring the volume of matter removed by corrosion from cylindrical samples endowed with a rotary motion in a bath of soda-lime glass at 1400° C. for 3 days. The materials in Table 2 show a good behaviour in this test in which, by way of control, are employed a sample D of a fused cast refractory product having the composition of the product No. 1 in Table 1 and a sample E obtained by moulding a refractory cement having the following chemical composition in percent by weight: 15% of $ZrO_2$, 77% of $Al_2O_3$, 1% of $SiO_2$, 0.1% of $Fe_2O_3$, 2.4% of $P_2O_5$ and exhibiting a firing loss of 4.5%.

TABLE 2

| Constituents of the composition | Composition, % by wt. | | |
|---|---|---|---|
| | A | B | C |
| Granules (2–5 mm) of the Product No. 1 from Table 1 | — | — | 20 |
| Small grains (0.5–2 mm) of the Product No.1 from Table 1 | — | 55 | 30 |
| Flour (40μ to 0.5 mm) of the Product No.1 from Table 1 | 50 | 15 | 24 |
| Fines (<40μ) of the Product No.1 from Table 1 | 43 | 21 | 17 |
| Aluminous cement (Secar ® 250) | 2 | 4 | 4 |

TABLE 2-continued

| Constituents of the composition | Composition, % by wt. | | |
|---|---|---|---|
| | A | B | C |
| Vitreous silica (100 Å–5μ) | 5 | 5 | 5 |
| Long-molecular-chain alkyline polyphosphate (surface-active agent) | 0.1 | 0.1 | 0.1 |
| Water for working up, in % | 9 | 6 | 5 |
| PROPERTIES AFTER DRYING AT 110° C. | | | |
| Apparent bulk density in g/cm³ | 2.90 | 3.0 | 3.1 |
| Open porosity, % by volume | 20 | 18 | 17 |
| Flexural strength at room temperature, in kg/cm² | 20 | 100 | 150 |
| Compression strength at room temperature, in kg/cm² | 82 | 250 | 320 |
| PROPERTIES AFTER FIRING AT 1500° C. | | | |
| Apparent bulk density in g/cm³ | 3.0 | 3.1 | 3.2 |
| Open porosity, % by volume | 11 | 9 | 7 |
| Flexural strength at room temperature, in kg/cm² | 510 | 400 | 350 |
| Compression strength at room temperature, in kg/cm² | 2350 | 2300 | 2100 |
| Flexural strength at 1340° C., in kg/cm² | — | — | 130 |

The results obtained are the following:

| | Samples | | | | |
|---|---|---|---|---|---|
| | D | E | A | B | C |
| Corroded volume, cm³: | 3.6 | 18 | 6.6 | 7.2 | 9 |
| Corrosion index in %: | 100 | 20 | 54 | 50 | 40 |

These results show that the compositions of the invention yield products having a resistance to corrosion by molten glass which is equal to about half of the fused cast material D, which represents an excellent performance for a composition intended to be employed as a jointing composition.

The compositions A, B and C (because of their facility of working up), are particularly useful for filling joins of a thickness less than 15 mm, comprised between 15 and 25 mm, and greater than 25 mm, respectively. After having been fired at 1400° C. for a sufficient time to be sintered, the compositions A, B and C filling the joins adhere to the adjacent blocks or slabs of fused cast material, then effectively opposing infiltrations of molten glass.

Parts shaped from the compositions A, B and C in Table 2 likewise exhibit remarkable resistance after sintering at 1500° C. for 7 hours, to abrasion by aggressive agents such as sand, corundum and coke.

EXAMPLE II

As in Example I samples are prepared having the following composition F, in % by weight:

| | |
|---|---|
| Small grains (0.5–2 mm) of the Product No. 3 from Table 1 | = 30 |
| Flour (40μ–0.5 mm) of the Product No. 3 from Table 1 | = 20 |
| Fines (<40μ) of the Product No. 3 from Table 1 | = 17 |
| Alumina (0–30μ, median diameter: 6μ) | = 10 |
| Chromic oxide (0–15μ, median diameter: 4.5μ) | = 14 |
| Vitreous silica (100 Å–5μ, median diameter: 0.7μ) | = 5 |
| Aluminous cement (Secar 250) | = 4 |
| Surface-active agent (sodium polyacrylate) | = 0.3 |

-continued

| | |
|---|---|
| Water for working up, in % | = 5 |
| Properties after drying at 110° C. | |
| Apparent bulk density in g/cm³ | = 2.90 |
| Open porosity, % by volume | = 13 |
| Flexural strength at room temperature, in kg/cm² | = 60 |
| Compression strength at room temperature in kg/cm² | = 180 |
| Properties after firing at 1500° C. | |
| Apparent bulk density in g/cm³ | = 3.13 |
| Open porosity, % by volume | = 3.0 |
| Flexural strength at room temperature, in kg/cm² | = 370 |
| Compression strength at room temperature, in kg/cm² | = 1950 |

Resistance to corrosion in the same test as that described in Example I yields the following results:

| | D | E |
|---|---|---|
| Volume of the corrosion, in cm³ | 3.6 | 2 |
| Corrosion index in % | 100 | 180 |

Example II exhibits exceptional resistance to corrosion by molten glass. However, this composition has a tendency to colour the glass, which may be a redhibitory drawback in certain cases.

EXAMPLE III

As in Example I samples are prepared having the following composition G in % by weight:

| | |
|---|---|
| Flour (40μ–0.5 mm) of the Product No. 2 from Table 1 | = 50 |
| Fines (<40μ) of the Product No. 2 from Table 1 | = 33 |
| Zirconia (0–20μ, median diam. 3.4μ) | = 10 |
| Vitreous silica (100 Å–5μ) | = 5 |
| Aluminous cement (Secar 250) | = 2 |
| Long-chain alkaline polyphosphate | = 0.1 |
| Water for working up, in % | = 9 |

The samples moulded from this composition G exhibit a corrosion index equal to 60 by the molten glass, which is higher than that of the composition A in the test described in Example 1; the resistance to corrosion is less than that of the composition F of Example II but it offers the advantage of not colouring the glass.

| | |
|---|---|
| Properties after drying at 110° C. | |
| Apparent bulk density in g/cm³ | = 3.0 |
| Open porosity, % by volume | = 20 |
| Flexural strength at room temperature, in kg/cm² | = 20 |
| Compression strength at room temperature, in kg/cm² | = 80 |
| Properties after firing at 1500° C. | |
| Apparent bulk density in g/cm³ | = 2.95 |
| Open porosity, % by volume | = 17 |
| Flexural strength at room temperature, in kg/cm² | = 255 |
| Compression strength at room temperature, in kg/cm² | = 2100 |

This composition G is useful especially as a composition for jointing joins of a thickness less than 15 mm.

EXAMPLE IV

As in Example I samples are prepared having the following composition H in % by weight:

| | |
|---|---|
| Granules (2–5 mm) of the Product No. 4 from Table 1 | = 20 |
| Small grains (0.5–2 mm) of the Product No. 4 from Table 1 | = 30 |
| Flour (40μ–0.5 mm) of the Product No. 4 from Table 1 | = 24 |
| Fines (<40μ) of the Product No. 4 from Table 1 | = 17 |
| Vitreous silica (100 Å–5μ) | = 5 |
| Aluminous cement (Secar 250) | = 4 |
| Long-chain alkaline polyphosphate | = 0.1 |
| Water for working up, in % | = 4.5–5 |
| Properties after drying at 110° C. | |
| Apparent bulk density in g/cm³ | = 3.92 |
| Open porosity, % by volume | = 13 |
| Flexural strength at room temperature, in kg/cm² | = 70 |
| Compression strength at room temperature, in kg/cm² | = 420 |
| Properties after firing at 1500° C. | |
| Apparent bulk density in g/cm³ | = 4.0 |
| Open porosity, % by volume | = 15 |
| Flexural strength at room temperature, in kg/cm² | = 180 |
| Compression strength at room temperature, in kg/cm² | = 650 |

This composition H is useful especially as a composition for jointing joins of a thickness of 15 to 25 mm.

EXAMPLE V

As in Example I samples are prepared having the following composition I in % by weight:

| | |
|---|---|
| Granules (2–5 mm) of the Product No. 1 from Table 1 | = 20 |
| Small grains (0.5–2 mm) of the Product No. 1 from Table 1 | = 30 |
| Flour (40μ–0.5 mm) of the Product No. 1 from Table 1 | = 24 |
| Fines (<40μ) of the Product No. 1 from Table 1 | = 7 |
| Aluminous cement (Secar 250) | = 4 |
| Alumina (0–30μ, median diam. 6μ) | = 10 |
| Vitreous silica (100 Å–5μ) | = 5 |
| Long-chain alkaline polyphosphate | = 0.1 |
| Water for working up, in % | = 6 |
| Properties after firing at 1600° C. | |
| Apparent bulk density in g/cm³ | = 3.06 |
| Open porosity, % by volume | = 2.4 |
| Flexural strength at ambient temperature, in kg/cm² | = 470 |

This composition I is useful especially for manufacturing articles by casting and vibrating, which after firing at 1600° C. exhibit good resistance to abrasion by blasting with grains of corundum.

We claim:

1. An unshaped refractory composition which consists essentially of by weight:
   (a) 55 to 99% of particles of a fused cast refractory material which contains a vitreous phase and the composition of which consists essentially of, as main constituents, $ZrO_2$, $Al_2O_3$ and $SiO_2$, or $ZrO_2$, $Al_2O_3$, $SiO_2$ and $Cr_2O_3$;
   (b) 1 to 4% of a hydraulic cement;
   (c) 1 to 15% of a filler consisting of very fine, substantially spherical particles of a metal oxide selected from the group consisting of vitreous silica, alumina, chromic oxide ($Cr_2O_3$) and zirconia, the surface area of these particles being higher than 5 $m^2/g$;

(d) 0 to 25% of fine particles of a size less than 40 microns selected from the group consisting essentially of particles of zirconia, alumina, chromic oxide $Cr_2O_3$, fused cast refractory products the chemical composition of which comprises by weight 75-85% $ZrO_2$, 2-8% $SiO_2$, 9-17% $Al_2O_3$, 0.5-0.7% of other oxides, and mixtures thereof; the proportion of each of the constituents (a), (b), (c) and (d) being given with respect to the total of the ingredients (a), (b), (c) and (d); and (e) 0.01 to 1% of a surface-active agent, the amount being with respect to the total weight of the constituents (a), (b), (c) and (d), said surface-active agent imparting a Newtonian behavior to the composition.

2. A composition as in claim 1, in which the constituent (a) is present in an amount of at least 75% by weight.

3. A composition as in claim 1, in which the constituent (c) is present in an amount of 3 to 7% by weight.

4. A composition as in claim 1, in which the constituent (d) is present in an amount of 6 to 25% by weight.

5. A composition as in claim 1, in which the particles of constituent (a) have sizes comprised between 1 micron and 5 mm.

6. A composition as in claim 1, in which the constituent (a) in selected from the refractory products having the following chemical compositions by weight:
(a) 32.5-54% of $ZrO_2$, 36 to 51% of $Al_2O_3$, 2 to 16% of $SiO_2$, 0.28 to 1.5% of $Na_2O$, less than 1.5% of other oxides;
(b) 75 to 85% of $ZrO_2$, 9 to 17% of $Al_2O_3$, 2 to 8% of $SiO_2$, 0.5 to 0.7% of other oxides; and
(c) 1 to 74% of $Cr_2O_3$, 15 to 40% of $ZrO_2$, 3 to 76% of $Al_2O_3$, 7.5% to 20% of $SiO_2$, and 0.4 to 2.5% of $Na_2O$, the ratio $SiO_2/Na_2O$ being between about 8 and 18.

7. A composition as in claim 1, which is worked up by the addition of an amount of water comprised between 3 and 25% by weight with respect to the total weight of the constituents (a), (b), (c) and (d).

* * * * *